United States Patent [19]
Lambert et al.

[11] Patent Number: 4,730,214
[45] Date of Patent: Mar. 8, 1988

[54] METHOD AND APPARATUS FOR CORRELATING VIDEO AND FILM IMAGES PRODUCED FROM ELECTRONIC DATA

[75] Inventors: Thomas W. Lambert, Dousman; Walter L. Robb, Brookfield; Barry F. Belanger, Milwaukee, all of Wis.

[73] Assignee: General Electric Company, Milwaukee, Wis.

[21] Appl. No.: 907,454

[22] Filed: Sep. 15, 1986

[51] Int. Cl.⁴ .................. H04N 17/00; H04N 5/84
[52] U.S. Cl. .................. 358/139; 358/244; 358/335
[58] Field of Search .............. 358/139, 335, 345, 244, 358/310, 111; 346/108, 110; 369/101, 125

[56] References Cited
U.S. PATENT DOCUMENTS 4,096,530  6/1978  Plugge et al. .................. 358/244
4,511,929  4/1985  Maeda et al. .................. 358/335
4,519,008  5/1985  Takenouchi et al. ........... 358/335

Primary Examiner—Howard W. Britton
Assistant Examiner—John K. Peng
Attorney, Agent, or Firm—Douglas Stoner; James H. Beusse

[57] ABSTRACT

A system for transferring electronic image data to film which provides correlation or matching between an image as viewed on a video monitor and an image viewed on film. Apparatus is disclosed for measuring image intensity on a video monitor and converting the measured intensity to electronic signals. The image intensity on film under controlled lighting is measured and signals representative of film density provided. The signals obtained by the two measurements are compared and any difference is used to vary a film writing system in a manner to minimize the difference.

10 Claims, 3 Drawing Figures

METHOD AND APPARATUS FOR CORRELATING VIDEO AND FILM IMAGES PRODUCED FROM ELECTRONIC DATA

The present invention relates to systems for transferring electronic image data to film images and, more particularly, to a system for producing a film image which when displayed will correspond in brightness and contrast to a video image.

In multi-format camera (MFC) systems presently used in transferring electronic image data to film images, the image to be transferred is generally previewed by an operator viewing a television monitor. The operator may select from the monitor certain views which are to be coverted to permanent images on film. In these systems the image data is usually manipulated to control the intensity of the image as presented on both the video monitor and the film. For example, MFC systems are widely used in medical diagnostic systems for transferring data obtained by x-ray imaging, magnetic resonance imaging and other diagnostic techniques to film.

It is desirable and expected by the operator that the image captured on film be substantially identical to that observed on the monitor, i.e., the image intensity and contrast on the monitor should match that of the film backlit by a lightbox. The intensity and contrast of the film displayed on the lightbox depends on the intensity of the backlighting and the optical density of the film at any given point. Any deviations or differences between the two images may effect the ability of a physician to accurately diagnose medical conditions.

The regulation of film density is described in U.S. patent application Ser. No. 761,439 now U.S. Pat. No. 4,700,058, filed Aug. 1, 1985 and assigned to the assignee of the present invention. The text of that application is hereby incorporated by reference. In essence, that application provides a method and apparatus for producing uniform film images from electronic data. The factors which influence the conversion of electronic data to film image are primarily variations in the intensity of the film writing light source and variations in film processing due to contamination and changes of chemical used in the processing. The inventive system of the aforementioned U.S. patent application utilizes electronic controls for periodically calibrating the film writing device and for adjusting the image data to maintain desired film density constant over time. The film density is compared to a set of intensity values which represent a desired intensity or film density. Deviations in measured film density when compared to the desired values are corrected by adjusting the "intensity" represented by the electronic image data. Accordingly, it is desireable to provide a set of intensity values representative of the values to be reproduced on film. The intensity values may represent grey scale values or the familiar red, green and blue color scale values.

SUMMARY OF THE INVENTION

Among the objects of the present invention is the provision of a method and apparatus for establishing a set of electronic intensity values for controlling film density in a system for converting or transferring electronic image data to film images. This and other objects are attained in a system in which electronic image data is converted to a video image on a television monitor. Apparatus is provided for measuring the intensity values appearing on the monitor under desired conditions and for storing the measured intensity values as a set of calibration standards. A film is prepared in a film writing system using the same electronic image data and the resultant intensity values on the film compared to the calibration standards. Any deviations determined by the comparison are corrected by adjusting the intensity values of the electronic image data coupled to the film writing system. In an illustrative embodiment, the image intensity on the monitor is determined by a portable apparatus including a photocell for producing an electrical signal representative of light intensity or brightness. The photocell signal is appropriately scaled and stored. The stored values are transferred to a calibration data storage device in the electronic image transfer and conversion system for use in calibrating film images. In another arrangement, the apparatus may also be used to directly measure film density for comparison against the data obtained from the monitor. The measurement of film density may require measurement while the film is backlit by a lightbox.

DESCRIPTION OF THE DRAWINGS

For a better understanding of the present invention, reference may be had to the following detailed description taken in conjunction with the accompanying drawing in which:

FIG. 3 is one form of apparatus according to the present invention for obtaining video intensity and film density values for use in the system of FIG. 1.

DETAILED DESCRIPTION OF THE INVENTION

Figure 1:
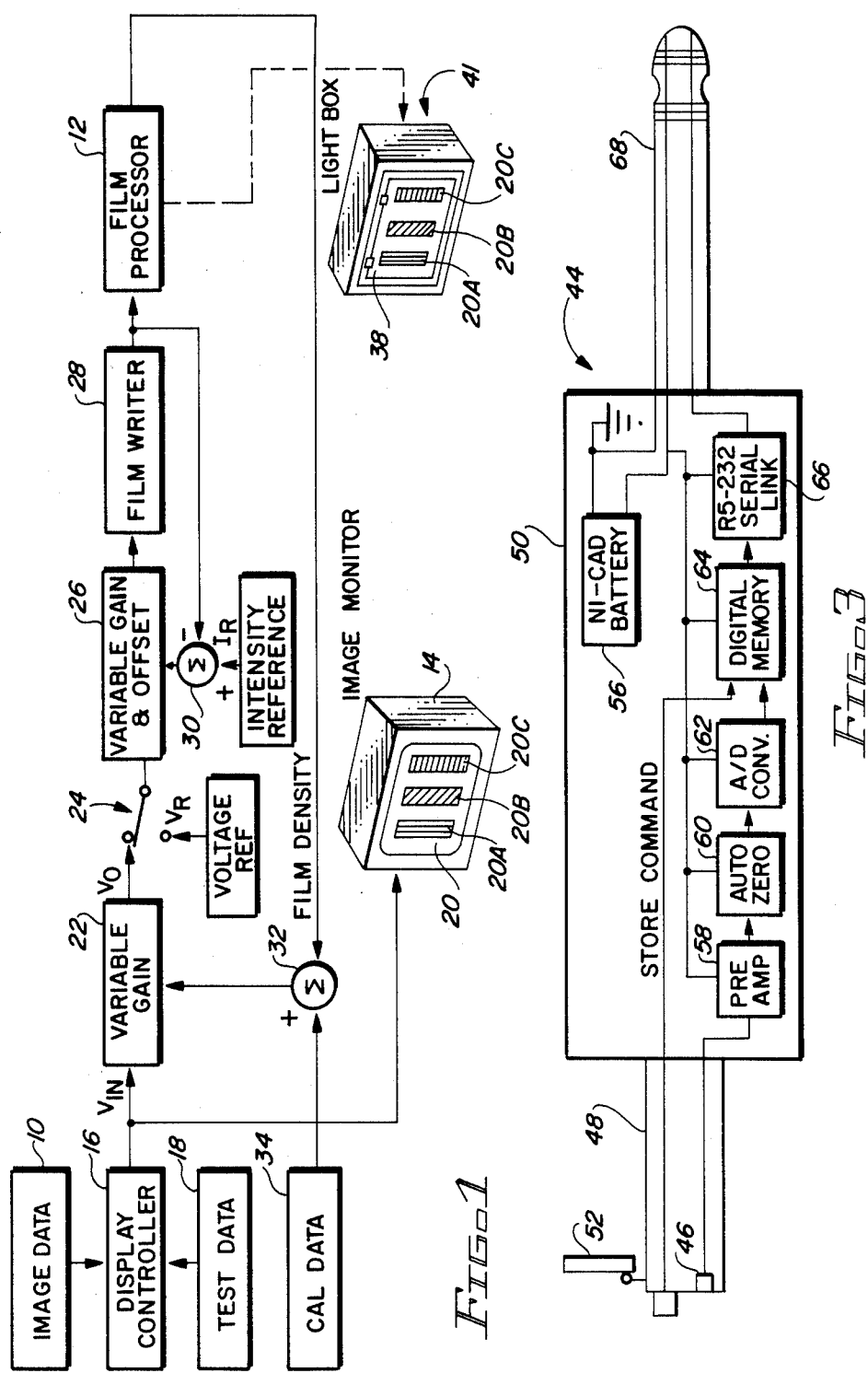
FIG. 1 is a simplified block diagram of a system for transferring electronic data to film images using the present invention.

Referring now to FIG. 1, there is shown a simplified block diagram of an electronic image processing system including a film processing system incorporating a control system with which the present invention is particularly useful. The overall system function is to convert image data supplied from electronic source 10 into viewable images on either positive or negative film in film processor 12. The image data is generally supplied from a storage medium. It is desireable that the data converted to an image on film accurately represent the image data and also correspond to a monitored video image on video monitor 14. It is also important that the image represented on the film be of a high quality, for example, to enable accurate diagnosis of any medical problem appearing on the film. In achieving this last function, the conversion system must be capable of maintaining a constant relationship between image data and film density over time, and yet provide for a minimum amount of setup and adjustment time.

The image data from source 10 may be either in analog or digital form. A display controller 16 converts the data to a standard format for application to television type monitor 14. Controller 16 also includes circuitry for selectively switching to either presentation of image data or presentation of calibration or test data from block 18. The test data may comprise, for example, a set of grey scale values formatted to create a sensitometric strip 20 on monitor 14 and on the processed film. Such a strip 20 is described in the aforementioned U.S. patent application Ser. No. 761,439 now U.S. Pat. No. 4,700,058. Alternately, the test data may provide a plurality of different color sensitometric strips such as, for example, red, green and blue scale strips represented by 20A, 20B and 20C. For color applications, the strips 20 may be generated simultaneously or sequentially. The formatted data from controller 16 is coupled to a controllable gain block 22 which may be appropriately characterized as a transfer device having a predetermined transfer function for converting an input signal $V_{in}$ to an appropriately corresponding output signal $V_o$.

The output signal developed by the block 22 is connected through an electronic switch 24 to a further block 26. The block 26 represents a second amplifier which also has an adjustable gain and, in addition, is capable of having zero offset which is variable.

The signal produced by the block 26 is coupled to appropriate input terminals of a film writing device 28 which may be a cathode ray tube (CRT) or laser, both of which are well known in the art. As is well known, the CRT or laser characteristic tends to be non-linear with respect to the input drive signal, i.e., the brightness of the generated light beam is a non-linear function of the amplitude of the input drive signal. A laser writing source could be advantageous in a color image system since laser light is monochromatic and would enable color writing without filtering although requiring at least three writing sources. While a color CRT would permit simultaneous writing of all colors, the resolution is generally not as good as multiple CRT's or lasers.

Continuing with the block diagram, there is shown a final block 12 which represents the film developing and processing in order to develop the final film image. As will be appreciated, the ouput signal indicated as produced by block 28 is in reality the light output of the CRT or laser which is used to expose the film prior to developing. The effect of any given writing intensity, I, is to produce a film density, D, on the exposed film. The film density versus exposure intensity characteristics are also non-linear and such characteristics are well known in the film processing art.

The control system includes two feedback loops, a first of which monitors the light intensity from the film writing device 28 and provides a feedback signal to the variable gain amplifier 26 in order to maintain the light output of the film writing device at a desired level. The second feedback control loop monitors the density of the exposed and developed film and provides a feedback signal to the variable gain amplifier block 22 which adjusts the magnitude of the image data signal supplied to the block 26 in order to drive the film density in a direction to correct for any deviations from a desired density. In the operation of the system, there is provided a calibration mode in which the initial values of light intensity output from the film writing device 28 may be established followed by a subsequent step of providing a reference data signal which allows the film density to be adjusted to a desired value. In the calibration of the film writing device 28, the switch 24 is placed in a position such that a voltage reference signal $V_r$ is applied as an input signal to the amplifier 26. Obviously, the use of the $V_r$ signal is to assure that a known reference is applied for calibration purposes. A signal $I_r$, which is summed in summing block 30 with a feedback signal representative of write intensity or light output of the film writing device 28, is simply an adjustment signal which can be varied in order to adjust the light output to a desired level. Similarly, film density is established by providing a known set of reference data values, i.e., test data, as an input signal to the block 22 while monitoring the density of a film produced at block 12. The feedback loop provides signals indicative of film density which are then compared or summed in summing block 32 with a set of desired film density signals provided by calibration data block 34.

Figure 2:
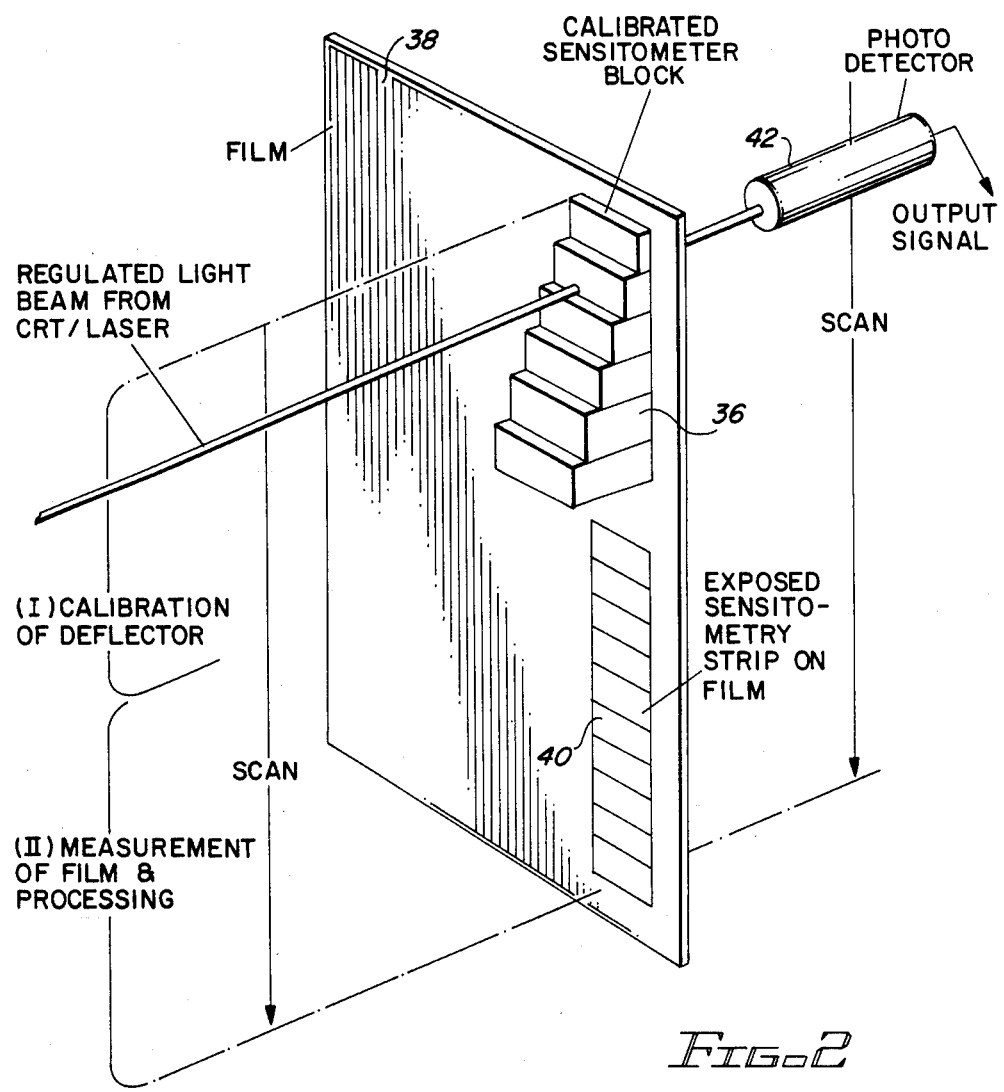
FIG. 2 is a diagram of one method for obtaining film density values.

It will be apparent that the closed loop control of film density requires that the film first be exposed with a known scale of write intensities and thereafter developed. Subsequently, the densities produced on the film in response to the exposure are read to determine whether the write intensities must be adjusted such that the desired film densities are achieved. In order to accomplish these functions, the write intensity output of the CRT or laser device 28 is adjusted to provide an initial known light intensity. Once the film has been exposed and then developed, it can be returned to the writing point in front of the device 28 and the calibrated light output of the writing device 28 used to read the actual film density. One form of a reading process is illustrated in FIG. 2. As is shown, the regulated light beam from the writing device 28 is first passed through a calibrated sensitometric block 36 which is mounted adjacent the film writing device 28 in a position abutting the point at which film is inserted to be exposed to the light from the film writing device 28. In the calibration mode the film is placed in position so that the light beam passes through both the sensitometric block 36 and a film 38. The film 38 also includes an exposed sensitometric strip 40 normally positioned along an unused edge of the film. The sensitometric strip is created by the test data signals from block 18 applied to the film writing device 28 during the calibration cycle. Creation of a sensitometric strip on an unused edge of film is well known in the art and will not be described in further detail. During the calibration process, the regulated light beam from the writing device 28 is scanned in a vertical direction along the edge of the film strip 38 first passing through each step of the sensitometric block 36 and then through each of the intensity blocks on the exposed sensitometric strip 40. A photodetector 42 located behind the film strip 38 senses the light from the film writing device 28 which passes through the sensitometric block 36 and sensitometric strip 40 and provides output signals proportional to the magnitude of the light impinging on it. The photodetector 42 preferably comprises a single photodetector which scans in synchronism with the regulated light beam from the film writing device 28 so as to receive the light beam as it scans down the edge of the film 38. The output signals developed by the photodetector 42 are proportional to the amount of light passing through each section of the sensitometric block 36 and sensitometric strip 40. Since the sensitometric block 36 is a highly calibrated block, the initial portion of the scan is used to calibrate the photodetector 42. As the light beam thereafter passes through the sensitometric strip 40, the photodetector 42 will provide output signals representative of the density of the image on the film 38. It should be noted that the image forming the exposed sensitometric strip 40 is created by a step voltage. The use of a step voltage to produce the sensitometric strip 4 is well known in the art. Thus, it will be seen that by using the calibrated light output from the film writing device 28, film density can be controlled by periodically creating a sensitometric strip 40 on an edge of a film 38 and inserting the developed film in front of the writing device to allow the photodetector 42 to compensate the amplifier 22 for any deviations in film density from the desired value.

Although the disclosed method of calibration of film density is through use of the regulated light beam from the film writing device 28, it will be appreciated that an external calibrated light beam could be used for reading the film densities. For example, the film density could be determined by analysis in a lightbox such as is indicated at 41 in which the film 38 is displayed. The film density could be read using the photodetector 42 of FIG. 2. However, an improved method will be described with regard to FIG. 3.

By performing the calibration sequence described above, it can be seen that the transfer device 22 can be adjusted so as to modify image data in a manner to create a desired film density.

In the case of a look-up table, i.e., a digital memory system for processing digital image data, the transfer function of device 22 will be modified to provide an output voltage for any given input voltage command necessary to produce the desired film densities. In the look-up table format, the system has a greater cability of compensating for non-linear variations in the overall image conversion process. The look-up table can be constructed to have as many reference density settings as there are reference input voltage levels. By so doing, film gamma correction and/or corrections for the non-linearities of the film writing device 28 can be accomodated. However, the use of image data in an analog form provides a much simpler approach since the transfer device 22 may comprise a linear operational amplifier circuit with variable offset and variable gain. The gain and offset can then be adjusted so that the minimum and maximum film density signals produce the desired result and the other signals falling between the minimum and maximum levels would then produce an output signal varying linearly or piecewise linearly between the minimum and maximum values.

A detailed implementation of the system of FIG. 2, with the exception of the development of the calibration data signals, is shown in U.S. patent application Ser. No. 761,439, now U.S. Pat. No. 4,700,058 and will not be repeated herein. Turning now to FIG. 3, there is shown a simplified block diagram of one form of apparatus for obtaining calibration data signals. As previously described, it is desirable to generate an image on film which, when displayed on a lightbox, has the same intensities as an image on an electronic video monitor. The apparatus 44 of FIG. 3 is designed to be a portable light meter which can "read" intensity and convert the read intensity to a form suitable for use as calibration data. A light detector such as a photo-diode 46 is positioned adjacent an open end of a hollow cylinder 48, which cylinder 48 has a second end connected to a light impervious box 50. The open end of cylinder 48 is also provided with a hinged cover 52 for blocking light to the photo-diode 46 to permit dark current auto zero set. A push-button 54 protrudes from the open end of cylinder 48 and is connected to a switch (not shown) which actuates storage of the signal produced by photo-diode 46.

Within the box 50 there is provided a power source indicated as a battery 56 for supplying power to a plurality of electronic circuits. The circuits include a preamplifier 58 for amplifying the signal from the photo-diode 46, an auto-zero circuit 60 for setting a dark-current level, an analog to digital converter 62 for converting the analog output signals from photo-diode 46 into digital data signals, a digital memory 64 for storing the digital data signals and an RS-232 serial link interface 66 for transferring data from the memory 64 to an external storage device such as that shown at 34 in FIG. 1. The connection to the interface 66 may be by means of a three terminal phone plug 68. Each of the circuits within the box 50 are commercially available circuits and their function and operation well known. The unique combination of these circuits provides a portable apparatus capable of reading light intensity levels, converting those levels to a digital signal and storing the digital signals for later transfer to a utilizing system.

In the use of the calibration apparatus 44, the end of the cylinder 48 is pressed against a face of the monitor 14 adjacent the sensitometric strips 20. The intensity of the scale value "seen" by the photodiode 46 is transferred to the digital memory 64. The apparatus 44 is then sequentially positioned to read each of the other scale values in a like fashion so that a complete set of calibration data is generated. The system is then caused to write the same scale values on film 38 and the film is developed and placed in lightbox 41. The apparatus 44 is used to read the intensities of the light through the scale 20 on film 38 in the same manner as was used to read the intensities on monitor 14. The data obtained by the film reading can then be compared with the data from the monitor reading and any difference used to adjust the amplifier 22. In essence, the data provided by apparatus 44 in reading film 38 becomes the feedback data applied to summing circuit 32.

It will be appreciated that what has been disclosed is a system for developing a set of calibration data which can be used to assure a match between an electronic image on a video monitor and a hard copy reproduction of that image on film. The disclosed system achieves this result by transferring appropriate intensity information from the viewing monitor to the film in a calibration process. While the invention has been disclosed in what is presently considered to be a preferred embodiment, many variations and modifications will become apparent to those skilled in the art. It is intended therefore that the invention be given the full spirit and scope of the appended claims.

We claim:

1. In an imaging system for transferring electronic image data to video and film images including an electronic monitor for providing a video image and a film writing system for transferring the electronic image data to film, a method for providing uniformity between the video image and the displayed film image comprising the steps of:

providing a set of intensity values on the monitor;
measuring the intensity of the values on the monitor;
converting the measured intensity values to electronic signals;
storing the electronic signals;
writing the intensity values on film;
summing the intensity values written on the film with the stored measured intensity values represented by the electronic signals; and
adjusting the writing intensity such that the film image intensity values correspond to the measured monitor intensity values.

2. The method of claim 1 wherein the step of adjusting the writing intensity includes the steps of:

establishing a predetermined write intensity level in response to a predetermined intensity signal value;
establishing a predetermined film density value in response to a predetermined image intensity signal; and modifying the electronic image data to minimize any difference between the video and film image intensities.

3. The method of claim 1 wherein said step of providing intensity values comprises providing a plurality of different color scale sensitometric calibration strips.

4. The method of claim 1 wherein the step of measuring the intensity values comprises the steps of:
exposing the intensity values to a light sensitive means providing the electronic signals representative of the intensity values; and
storing the signals in an electronic memory.

5. The method of claim 4 wherein the step of summing comprises the steps of:
transferring the electronic signals to a second memory device;
summing sequentially each of the intensity values on the film with a corresponding one of the intensity values represented by the electronic signals.

6. The method of claim 5 wherein the intensity values written on film are converted to electronic signals for comparison.

7. An electronic data conversion system for transferring data to film images having comparable intensity to a video image of the data comprising:
means for providing a set of electronic image data representative of an image to be displayed;
a video monitor coupled to receive and display the image represented by the data;
a film writing system;
means coupling said image data to said film writing system for writing the image represented by the data or film;
means for comparing the intensity of the film image displayed against a predetermined light intensity to the image intensity on the monitor; and
means for adjusting the film writing system to minimize any differences between the film image intensity and the monitor image intensity.

8. The system of claim 7 and including means for converting the intensity levels on the monitor image to a set of electronic signals.

9. The system of claim 8 wherein said converting means comprises:
a photodetector for providing a first signal representative of light intensity;
means for converting said first signal to a form for storage in a digital memory; and
means for selectively gating said digital memory for storing said first signal.

10. The system of claim 9 wherein said converting means includes means for selectively transferring said stored first signal to said film writing system.

* * * * *